Nov. 1, 1938.  C. S. JOHNSTON  2,135,080
JACK
Filed Dec. 31, 1935
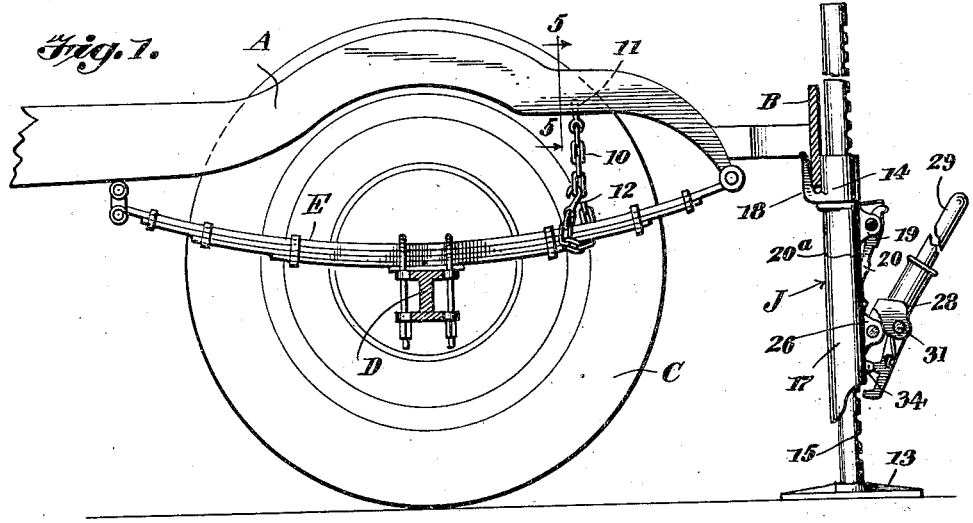
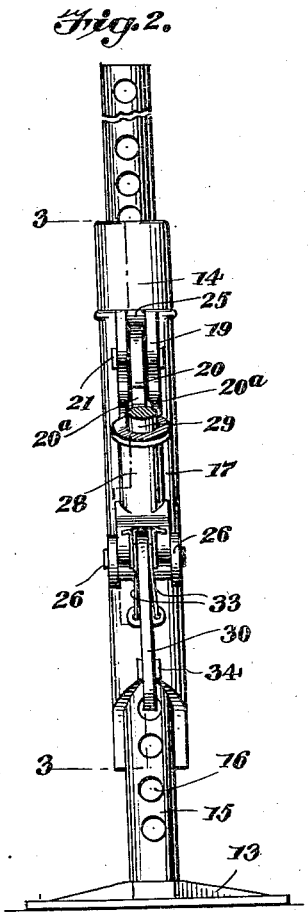
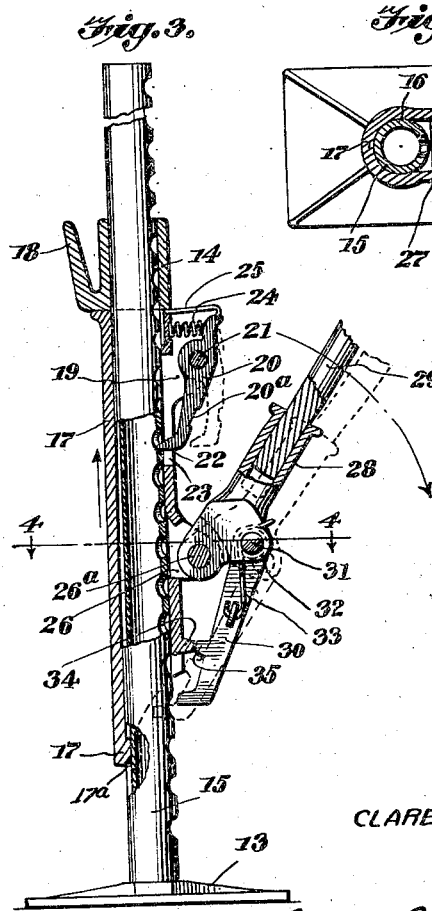
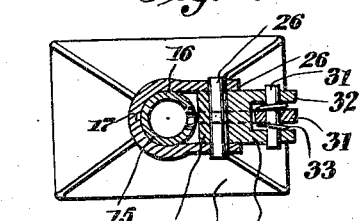
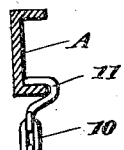
Inventor
CLARENCE S. JOHNSTON
By Irving R. M°Cathran
Attorney Patented Nov. 1, 1938

2,135,080

UNITED STATES PATENT OFFICE 2,135,080

JACK

Clarence S. Johnston, Amarillo, Tex., assignor, by direct and mesne assignments, of one and one-half per cent to Guilla Phipps, Fort Worth, Tex., nineteen and thirty-five thirty-sixths per cent to E. M. Keller, three per cent to J. B. Phipps, Jr., and forty-four and four-ninths per cent to F. C. Nelson and L. C. Bradford, all of Pampa, Tex.

Application December 31, 1935, Serial No. 57,049

6 Claims. (Cl. 254—108)

This invention relates to jacks, and has for its object the production of a simple and efficient automobile jack which is so constructed as to fit under the bumper of an automobile and efficiently lift the automobile without the necessity of placing the jack under the chassis or frame.

Another object of this invention is the production of a simple and efficient means for holding the lifting sleeve of the jack in an adjusted position, which means may be easily released for allowing the lifting sleeve to drop out of engagement with the automobile bumper when it is desired to remove the jack.

A further object of this invention is the production of a simple and efficient means for tying the spring to the chassis or frame of an automobile in a manner to cause the wheels and axle to be lifted with the chassis or frame.

A still further object of this invention is the production of a simple and efficient means for releasing the lifting dog as the operating handle of the jack is swung upwardly.

Other objects and advantages of the invention will appear throughout the following specification and claims.

In the drawing:—

Figure 1 is a side elevation of the improved jack shown in an operative position with respect to the chassis, axle, wheel and bumper of an automobile, certain parts being shown in section;

Figure 2 is an enlarged front elevation of the jack, the handle being shown in section;

Figure 3 is an irregular vertical section taken on line 3—3 of Figure 2;

Figure 4 is a transverse sectional view taken on line 4—4 of Figure 3;

Figure 5 is a section taken on line 5—5 of Figure 1.

By referring to the drawing, it will be seen that A designates the chassis or frame of the automobile which chassis carries a conventional bumper B. A wheel C is shown carried by the axle D, and a conventional spring E is shown supporting the chassis or frame A upon the axle D.

A chain 10 is anchored in engagement with the chassis A, as at 11, and this chain 10 is adapted to be passed around the spring E in the manner as shown in Figure 1, and also hooked, as at 12, when it is desired to jack up the automobile through the medium of the bumper engaging jack J. Through the medium of the chain 10, it will be seen that when the chassis A is lifted, the spring E, axle D, and wheel C will also be lifted. When the jack J is not being used, the chain 10 may, if desired, be wound about the chassis A and fastened out of contact with the spring E.

The jack J comprises a base 13, which carries the lower end of the vertical standard 15. The standard 15 is preferably of a hollow metal structure having apertures 16 formed along one side, as shown in Figures 2 and 3.

A lifting shank or sleeve 17 is slidably mounted upon the standard 15, and this lifting shank or sleeve 17 is provided with an upwardly extending spaced lifting hook 18 which is carried by a swivelled collar 14. A pair of dog supporting ears 19 are carried by one side of the shank 17, and a latching dog 20 is pivoted upon the ears 19 by means of a journal pin 21. The latching dog 20 is provided with a toothed end 22 for extending through the aperture 23 in the sleeve 17, and engaging one of the notches or apertures 16 for holding the sleeve 17 in a vertically adjusted position. A coil spring 24 engages the upper end of the dog 22 for normally holding the toothed end 22 in a locking engagement with one of the apertures 23. A flat spring 25 is adapted to catch over the upper end of the dog 20 and hold the dog 20 in a disengaging position when the dog 20 is swung outwardly, as shown in dotted lines in Figure 3. The dog 20 is provided with finger holds or grips 20a to facilitate the swinging of the dog 20 to a disengaged position. The sleeve 17 is keyed as at 17a to the standard 15 to permit the sleeve 17 to freely slide and at the same time hold the sleeve 17 against rotation upon the standard 15.

By carefully considering Figure 1, it will be noted that the upwardly extending lifting hook 18 is secured to the collar 14 at its lower end and is spaced from the collar. The upper end of the lifting hook 18 terminates in approximate alignment with the upper end of the collar 14 thereby providing a pocket of considerable depth for receiving a bumper of an automobile. Because of this structure and the fact that the bumper of an automobile may fit into the pocket, as shown in Figure 1, the bumper will be held in a vertical position or an upright position against accidentally falling away from a bumper which it engages while the jack is being adjusted to a lifting position. No other securing means is necessary.

The sleeve 17 carries a pair of laterally extending journal ears 26 upon the sides thereof, as shown in Figure 4, and the inner end 27 of the neck 28 is journaled upon these ears 26 by means of a journal pin 26a. The neck 28 receives the inner end of the operating handle 29.

A lifting dog 30 is pivotally mounted upon the pin 31 carried by the ears 32 of the neck 28, and a spring 33 engages the dog 30 to urge the dog 30 normally into engagement with the notches or apertures 16 of the standard 15. The sleeve 17 carries a projecting lug 34 near its lower end below the ears 26, and the lug 34 extends outwardly toward the dog 30. The dog 30 also carries a lug 35 upon its inner face and this lug 35 is adapted to engage the lug 34 as the handle 29 is swung upwardly to the position shown in full lines in Figure 3 for kicking the dog 30 to a disengaged position, thereby allowing the sleeve 17 to drop downwardly.

The operation of the jack is as follows:—

The chain 10 is fastened to the chassis A and spring E, as shown in Figure 1, and the hook 18 is placed under the bumper B with the jack J resting, as shown also in Figure 1. The operating handle 29 is then forced downwardly causing the dog 30 to engage one of the apertures 16, and as this movement continues, the sleeve 17 will be raised vertically, the dog 20 also engaging one of the apertures 16 for preventing the sleeve from sliding downwardly when the operating handle 29 is raised to allow the dog 30 to engage the next higher aperture 16. This operation is continued until the sleeve 17 has raised the bumper B to the desired height and the wheel C has been lifted from the ground.

When it is desired to lower the jack, the dog 20 may be swung outwardly and the flat spring 25 will engage the upper end of the dog 20, to hold the dog 20 out of engagement with the standard 15. The handle 29 is then swung upwardly to the position shown in full lines in Figure 3, and as the dog 30 is kicked out of engagement with one of the apertures 16 of the standard 15, the sleeve 17 will drop to a lowered position.

From the foregoing description, it will be seen that a simple and efficient jack has been produced for lifting an automobile without the necessity of crawling or reaching under the vehicle in order to place the jack in position, and also that the jack may be easily released simply by swinging the cam lever 25 to the position shown in Figure 5.

Certain detail changes in the construction of the device may be employed without departing from the spirit of the invention, so long as such changes fall within the scope of the appended claims.

Having described the invention, what is claimed as new is:

1. A jack of the class described comprising a standard, said standard having vertically aligned apertures, a sleeve slidable upon said standard, latching means for holding said sleeve in an adjusted position upon said standard, a releasable spring catch for holding said latching means in an inoperative position, a neck pivotally mounted upon said sleeve below said latching means, a spring pressed lifting dog carried by said neck for engaging said apertures and lifting said sleeve, a handle engaging said neck, and means adapted to engage said lifting dog and mounted adjacent thereto for automatically moving said lifting dog to a disengaging position as said handle is swung upwardly.

2. A jack of the class described comprising a standard, said standard having vertically aligned apertures, a sleeve slidable upon said standard, latching means for holding said sleeve in an adjusted position upon said standard, a releasable spring catch for holding said latching means in an inoperative position, a neck pivotally mounted upon said sleeve below said latching means, a spring pressed lifting dog carried by said neck for engaging said apertures and lifting said sleeve, a handle engaging said neck, and a lug carried by said sleeve and adapted to engage said lifting dog and mounted adjacent thereto for automatically moving said lifting dog to a disengaging position as said handle is swung upwardly.

3. A jack of the class described comprising a standard, said standard having vertically aligned apertures, a sleeve slidable upon said standard, latching means for holding said sleeve in an adjusted position upon said standard, a releasable spring catch for holding said latching means in an inoperative position, a neck pivotally mounted upon said sleeve below said latching means, a spring pressed lifting dog carried by said neck for engaging said apertures and lifting said sleeve, a handle engaging said neck, a lug carried by said sleeve, and said lifting dog having a lug upon its inner face adapted to engage said lug on said sleeve for moving said lifting dog to a disengaged position when said handle is moved to a raised position.

4. A jack of the class described comprising a standard, a sleeve slidably mounted vertically upon said standard, latch means for holding said sleeve against accidental downward sliding movement, an operating lever pivoted upon said sleeve, a lifting dog pivoted upon said lever, said standard having means engageable by the dog whereby the sleeve will be lifted vertically as said dog engages the standard and said lever is swung, and means engageable with said lifting dog when said lever is swung to a predetermined lifted position for automatically kicking said lifting dog out of engagement with said standard.

5. A jack of the class described comprising a standard, a sleeve slidably mounted vertically upon said standard, means carried by said sleeve for engaging and lifting an object, latch means for holding said sleeve against accidental downward sliding movement, an operating lever pivoted upon said sleeve, a lifting dog pivoted upon said lever, said standard having means engageable by the dog whereby the sleeve will be lifted vertically as said dog engages the standard and said lever is swung, and means carried by said sleeve for engaging the lifting dog when said lever is swung to a predetermined lifted position for automatically kicking said lifting dog out of engagement with said standard.

6. A jack of the class described comprising a standard, a sleeve slidably mounted vertically upon said standard, latch means for holding said sleeve against accidental downward sliding movement, an operating lever pivoted upon said sleeve, a lifting dog pivoted upon said lever, said standard having means engageable by the dog whereby the sleeve will be lifted vertically as said dog engages the standard and said lever is swung, a lug carried by said sleeve, a lug carried by the inner face of said lifting dog and adapted to contact with said first mentioned lug for automatically kicking said lifting dog out of engagement with said standard.

CLARENCE S. JOHNSTON.